United States Patent [19]
Kamiyama et al.

[11] Patent Number: 6,126,030
[45] Date of Patent: Oct. 3, 2000

[54] LINER FOR A MANHOLE AND A METHOD FOR LINING A MANHOLE

[75] Inventors: Takao Kamiyama, Hiratsuka; Yasuhiro Yokoshima, Ibaraki-ken, both of Japan

[73] Assignees: Shonan Gosei-jushi Seisakusho K.K., Kanagawa-ken; Yokoshima & Company, Ibaraki-ken, both of Japan

[21] Appl. No.: 09/080,925

[22] Filed: May 19, 1998

[30] Foreign Application Priority Data

May 19, 1997 [JP] Japan ..................................... 9-128941

[51] Int. Cl.[7] .................................................. B65D 88/76
[52] U.S. Cl. .......................... 220/484; 220/1.6; 220/567.1
[58] Field of Search .......................... 220/1.5, 1.6, 567.1, 220/565, 567.2, 484; 52/20; 264/232, 234, 257, 511, 338

[56] References Cited

U.S. PATENT DOCUMENTS

| 2,002,127 | 5/1935 | O'Neal | 52/20 |
| 4,865,220 | 9/1989 | Wiegand | 220/465 |
| 5,081,802 | 1/1992 | Westhoff et al. | 52/20 |

*Primary Examiner*—Stephen Castellano
*Attorney, Agent, or Firm*—McGuire, Woods, Battle & Boothe

[57] ABSTRACT

A flexible manhole liner bag soaked with a curable liquid resin is inserted into a manhole; this liner bag is equipped with step connectors having female screws, which are disposed to penetrate and be supported by a fabric layer of the liner bag; the open ends of the female screws are substantially flush with the inner face of the fabric layer, and male screws are screwed into these female screws and a sealing material is applied between the internal thread of the female screws and the external thread of the male screws.

17 Claims, 16 Drawing Sheets

LINER FOR A MANHOLE AND A METHOD FOR LINING A MANHOLE

BACKGROUND OF THE INVENTION

1. Field of the Invention

The present invention relates to a liner with which the interior of a manhole is lined (hereinafter called "manhole liner") and a method for lining a manhole with a manhole liner; and in particular the invention relates to a manhole liner impregnated with a thermosetting resin and a method for lining a manhole with such a liner.

2. Description of the Prior Art

When a manhole built in the ground becomes defective or too aged to perform properly, the manhole is repaired and rehabilitated without digging the earth to expose the manhole. This non-digging method of repairing an underground pipe has been known and practiced commonly in the field of civil engineering. Typically, the method is disclosed by European Patent Publication No. 0704294.

According to this publication, the method of manhole mending comprises: inserting into the manhole to be repaired a tubular manhole liner bag, which is made of a flexible resin-absorbable cloth material impregnated with a hardenable liquid resin and which has its outer surface hermetically covered with an impermeable polymeric film; inflating the liner bag to press it against the inner walls of the manhole by means of a fluid pressure or an inflatable pressure bag; and then curing the hardenable liquid resin to thereby harden the manhole liner bag, while the bag is closely pressed against the inner wall of the manhole. It is thus possible to line the inside wall of the defective or aged manhole with a rigid liner.

Incidentally, the above-mentioned inflatable pressure bag is inserted into the manhole liner bag in the following manner: the open end of the pressure bag is made to gape wide and hooked (anchored) at the upper open end of the manhole in a manner such that the wide-opened end of the pressure bag completely and fixedly covers and closes the upper open end of the manhole; a portion of the pressure bag is pushed into the manhole whereby an annular pocket is made; then, a pressurized fluid is applied to the pocket portion of the pressure bag such that the fluid urges the pressure bag to enter the manhole. Since one end of the pressure bag is hooked at the upper end of the manhole, it remains there while the rest of the pressure bag proceeds deeper into the manhole as it is turned inside out. (Hereinafter, this manner of insertion shall be called "everting" nor "eversion".)

Before lining the manhole with the liner bag in the above-mentioned method, however, a plurality of ladder steps, which are rigidly fastened to the inner wall of the manhole in a descendent row, must be removed, and when the manhole has been newly lined with the liner bag, holes are made at intervals through the rigid liner from inside the manhole and these holes extend partially into the wall of the manhole, and, then, a plurality of new ladder steps are hit in these holes and fastened therein.

However, if the manhole is very aged, the manhole wall is so fragile that the steps rooted in it cannot be reliably steady, and may fail to bear the weight of a man stepping on them. Hence, the applicant submitted a patent application (Japanese Patent Application No. 8-62735) wherein it is proposed that the ladder steps are supported by the manhole liner via step connector assemblies, rather than by the manhole wall.

More particularly, this proposal, as illustrated in FIG. 13, teaches that each step connector assembly includes bolts 108, which are supported by the rigid manhole liner 103 and partially extend beyond the inner face of the manhole liner 103. The step connector assembly further includes a pair of vertical plates 105, which are laid over the outer face of the manhole liner 103 and with which the heads of the bolts 108 are integrally formed. A plurality of such step connector assemblies to receive ladder steps are arranged in a row extending in the direction of the depth of the manhole liner bag 101. Then, as shown in FIG. 14, the manhole liner bag 101 provided with these step connector assemblies is inserted into a manhole 121 and hardened to fit on the inner wall of the manhole 121; next, an attachment plate of a ladder step 114 is engaged with the bolts 108, which are extending beyond the inner face of the liner 103, followed by screwing of nuts 109 on the threaded ends of the respective bolts 108 until the ladder step 114 is firmly supported by the manhole liner 103. Incidentally, in the case of FIG. 14, a plate is provided between the liner 103 and the step 114.

Thus, as a result of the above-described method, even in a case where the manhole 121 was so aged that the wall of the manhole was too fragile to hold steps on its own, it was possible to attach the ladder steps 114 with sufficiently high steadiness so that the steps would not totter when a person climbs them. Also, by virtue of the pre-installed bolts extending beyond the inner face of the manhole liner, the ladder steps could be easily attached to the liner, and it was unnecessary to make holes into the inner wall of the hardened liner for attachment of the ladder steps. Hence, the human labor at the site was much reduced and the operation time was substantially shortened.

(Problems the Invention seeks to solve)

However, in the above-described method, the bolts 108 protruded from the inner face of the manhole liner bag 101, and when an inflatable pressure bag 135 was everted into the manhole liner bag 101 after the latter had been inserted into the manhole 121, the pressure bag 135 is liable to be scratched by the bolts 108, as shown in FIG. 15, and as a result the pressure bag 135 burst occasionally; also, another problem was that the uncured hardenable liquid resin impregnated through the manhole liner 103 tended to permeate along the external threads of the bolts 108 and harden to clog the thread groove so that it sometimes became impossible to screw the nuts 109 on the bolts 108.

In an attempt to solve this problem, it was proposed to seal the threaded ends of the bolts 108 of the step connector assembly with caps 130 held by rubber plate 129, as shown in FIG. 16; however, even in this method, the uncured hardenable liquid resin impregnated through the manhole liner 103 continued to ooze along the external threads of the bolts 108 and harden so that it was sometimes impossible to screw the nuts 109 on the bolts 108, when the steps 114 were attached to the manhole (ref. FIG. 14).

SUMMARY OF THE INVENTION

The present invention was made in view of the above problems and others and it is, therefore, an object of the invention to provide a new manhole liner and a new method for lining a manhole with such improvements that it will become possible to prevent the pressure bag from bursting.

Also, it is another object of the invention to enable easy attachment of the steps to the manhole.

(Means to solve the Problems)

In order to solve the above problems and others, there is proposed a manhole liner with which an inner wall of a manhole is lined, comprising a resin-absorbent fabric layer soaked with a curable liquid resin, an airtight film layer covering up an outer face of the resin-absorbent fabric layer, and at least one step connector assembly capable of receiving a ladder step, the step connector assembly including a plurality of female screw means which are supported by the fabric layer and whose male screw receiving ends are substantially even with the inner (exposed) face of the fabric layer.

More practically the manhole liner is tubular in shape and the airtight film layer is bonded to the outer face of the resin-absorbent fabric layer.

It is even more practical that the tubular manhole liner has a bottom made of the same materials as the tubular part of the liner, such that the manhole liner is a bag, and the airtight film layer is bonded to the outer face of the resin-absorbent fabric layer by having been fused.

Preferably the fabric layer is penetrated by each one of the female screw means.

It is also preferred that each one of the female screw means has a flange portion provided at the other end thereof, the flange portion being disposed between the resin-absorbent fabric layer and the airtight film layer.

In a preferred embodiment, the step connector assembly further includes a first plate, which is disposed between the flange portion of the female screw means and the resin-absorbent fabric layer and, where the female screw means is absent, between the airtight film layer and the resin-absorbent fabric layer, and through which the female screw means penetrate.

In a more preferred embodiment, the airtight film layer and the resin-absorbent fabric layer are bonded together by means of a heat sensitive adhesive at locations constituting a marginal area surrounding the first plate.

It is still more preferred that the first plate has at least one penetrating hole in addition to those through which the female screw means penetrate, and the airtight film layer and the resin-absorbent fabric layer are bonded together by means of an adhesive at locations of the at least one penetrating hole.

In a best mode embodiment, the airtight film layer and the resin-absorbent fabric layer are bonded together at locations constituting a marginal area surrounding the first plate also.

It is also proposed that the step connector assembly further includes at least one male screw means, which is screwed into the female screw means.

It is more preferable that a sealing material is applied between an internal thread of the female screw means and an external thread of the male screw means.

Also preferred is that the step connector assembly further includes at least one second plate, which is disposed on the inner face of the resin-absorbent fabric layer and is penetrated by the male screw means.

Also preferably, the male screw means is a bolt and the step connector assembly further includes a washer disposed between the head of the bolt and the second plate.

In a best mode embodiment, the airtight film layer is a composite film layer including a nylon film.

It is also proposed that the thickness of the resin-absorbent fabric layer increases stepwise from the upper end to the lower end thereof.

The invention also proposes a method for lining a manhole comprising the steps of: (a) inserting into the manhole a tubular liner having a resin-absorbent fabric layer soaked with a curable liquid resin, an airtight film layer covering up an outer face of the resin-absorbent fabric layer, and at least one step connector assembly capable of receiving a ladder step, the step connector assembly including a plurality of female screw means which are supported by the fabric layer and whose male screw receiving end is substantially flush with the inner face of the fabric layer; (b) inserting an inflatable pressure bag inside the tubular liner; (c) closing the open end of the pressure bag thereby forming a closed space inside the pressure bag; (d) supplying pressurized fluid to the closed space to thereby cause the pressure bag to inflate and press the manhole liner against the inner wall of the manhole; (e) curing the liquid resin to thereby harden the manhole liner; (f) removing the pressure bag from the manhole; and (g) connecting at least one ladder step to the step connector assembly by screwing a plurality of male screw means into the female screw means.

Or in a best mode method the steps comprises: (a) preparing a tubular liner having a resin-absorbent fabric layer soaked with a curable liquid resin, an airtight film layer covering up an outer face of the resin-absorbent fabric layer, and at least one step connector assembly capable of receiving a ladder step, the step connector assembly including a plurality of female screw means which are supported by the fabric layer and whose male screw receiving end is substantially flush with the inner face of the fabric layer; (b) screwing a male screw means into each one of the female screw means after applying a sealing material to a threaded surface of the female screw means or the male screw means or both of these; (c) inserting this tubular liner into the manhole; (d) inserting an inflatable pressure bag inside the tubular liner; (e) closing the open end of the pressure bag thereby forming a closed space inside the pressure bag; (f) supplying pressurized fluid to the closed space to thereby cause the pressure bag to inflate and press the manhole liner against the inner wall of the manhole; (g) curing the liquid resin to thereby harden the manhole liner; (h) removing the pressure bag from the manhole; (i) unscrewing the male screw means from the female screw means; and (j) connecting at least one ladder step to the step connector assembly by screwing a plurality of male screw means into the female screw means.

EFFECTS OF THE INVENTION

According to the invention, the female screw means are arranged such that their male screw receiving ends are substantially even with the inner face of the fabric layer, so that no substantial protrusions occur from the inner face of the manhole liner and thus the pressure bag would not be scratched to burst.

Furthermore, since a sealing material is applied between the internal thread of the female screw means and the external thread of the male screw means, there is no possibility for the uncured hardenable liquid resin impregnated through the resin-absorbent fabric layer to permeate along the threads of the two screw means and clog the thread grooves. Hence, it becomes much easier to unscrew the male screw means from the female screw means of the step connector assemblies, and thus the operation of attaching the ladder steps can be conducted swiftly.

The above and other objects and features of the invention will appear more fully hereinafter in the following description given in connection with the accompanying drawings and the novelty thereof pointed out in the appended claims.

BEST MODE EMBODIMENT

Next, an embodiment of the present invention will be described with reference to the attached drawings.

Figure 1:
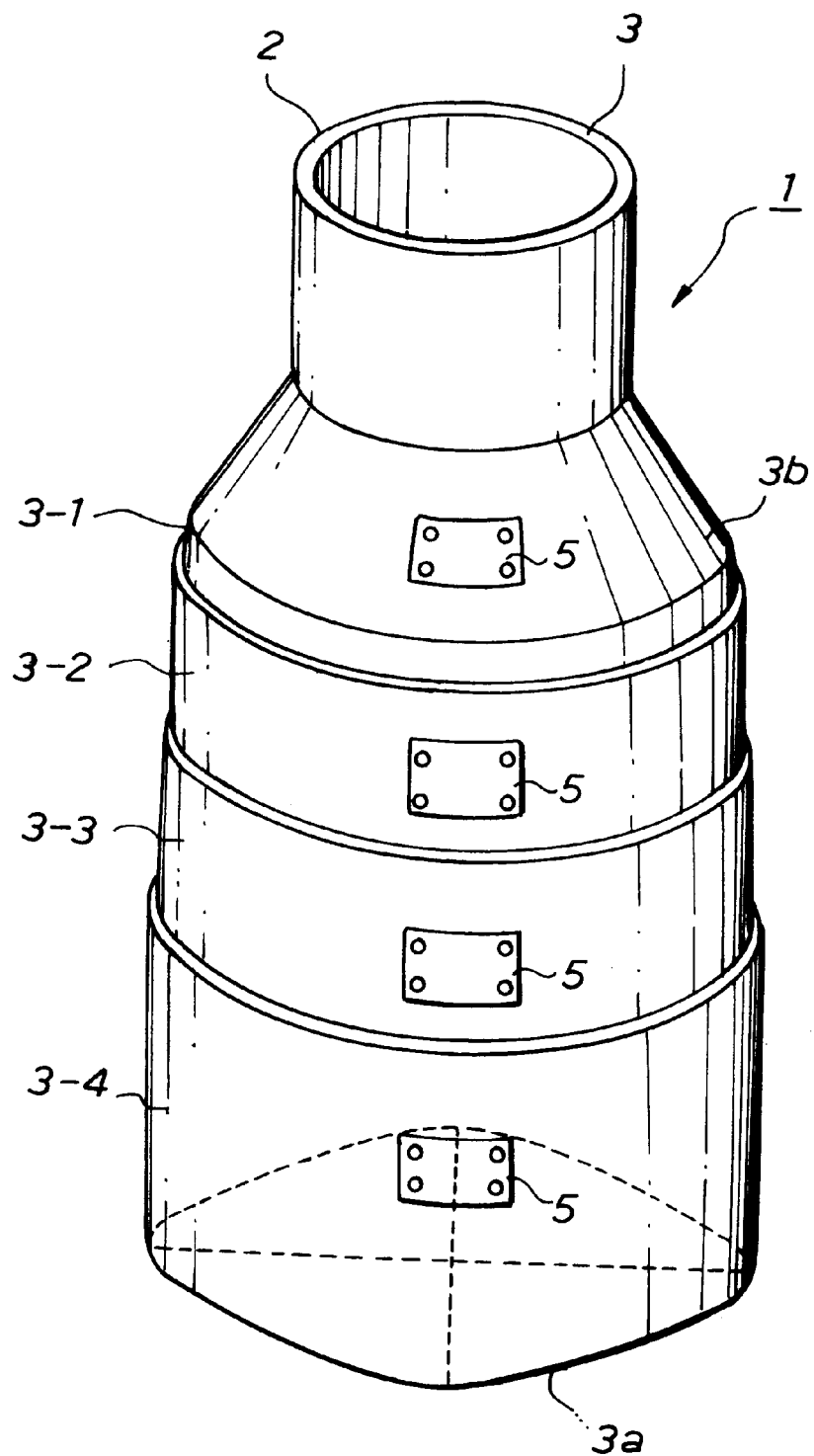
FIG. 1 is a perspective view of a manhole liner bag according to the present invention.
Figure 7:
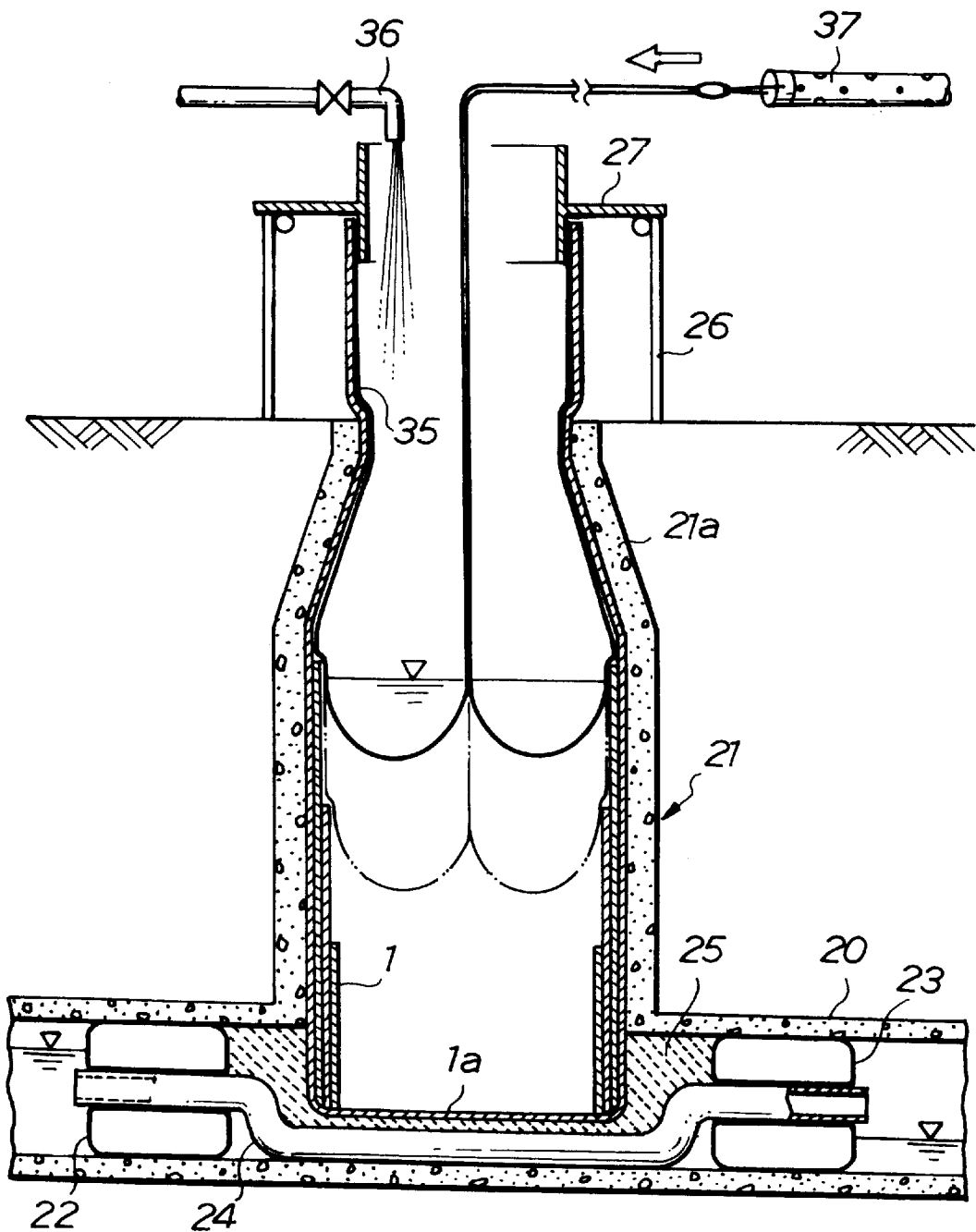
FIG. 7 is a cross-sectional view of a site containing a manhole, illustrating a step of a manhole lining method according to the present invention.

First, a manhole liner bag (hereinafter also referred to merely as "liner") 1 of FIG. 1 will be explained. A rectangular resin-absorbable fabric sheet 3-1 is wrapped into a tubular form so that the free edges come into butting relationship and are sewn together by means of a sewing machine. A bottom 1a is closed by cutting off some portions from the lower end of the fabric sheet 3-1 and folding and sewing together the remnant portions to form a bag, as shown in FIG. 1, and the upper part of the sheet bag 3-1 is deformed to have a shoulder portion 3b so as to tally with a reducer portion 21a of a manhole 21 (ref. FIG. 7), and this deformation is called reducer fitting.

A rectangular resin-absorbable fabric sheet 3-2 is wrapped about and bonded onto the sheet bag 3-1 in a manner such that the sheet 3-2 forms an outer sheet layer covering the side face of the sheet bag 3-1 from the latter's bottom edge to the vicinity of the shoulder portion 3b (ref. FIG. 1). Next, another rectangular resin-absorbable fabric sheet 3-3 is wrapped about and bonded onto the sheet 3-2 in a manner such that the sheet 3-3 forms a third sheet layer covering the fabric sheet 3-2 from the latter's lower edge to the vicinity of the upper end. Similarly a still another rectangular resin-absorbable fabric sheet 3-4 is applied to the sheet layer 3-3, and forms the fourth and outermost fabric sheet layer. Thus, the overall thickness of the fabric sheets increases stepwise toward the lower end of the manhole liner 1.

Incidentally, the fabric sheets 3-1 through 3-4, which constitute the resin-absorbable fabric layer 3, are a nonwoven felt of a synthetic resin such as polyester, nylon, polypropylene, and acrylic resin, or a glass fiber cloth, glass fiber mat, or glass felt, or a nonwoven felt of a mixture of any of said synthetic resins and glass fiber.

A plurality of rectangular step connector assemblies (four in number in this embodiment) are attached to the outer faces of the fabric sheets 3-1, 3-2, 3-3, and 3-4, respectively, at appropriate intervals, to provide bases for receiving ladder steps. The step connector assemblies are arranged in a row extending in the direction of the depth of the manhole liner 1.

Figure 2:
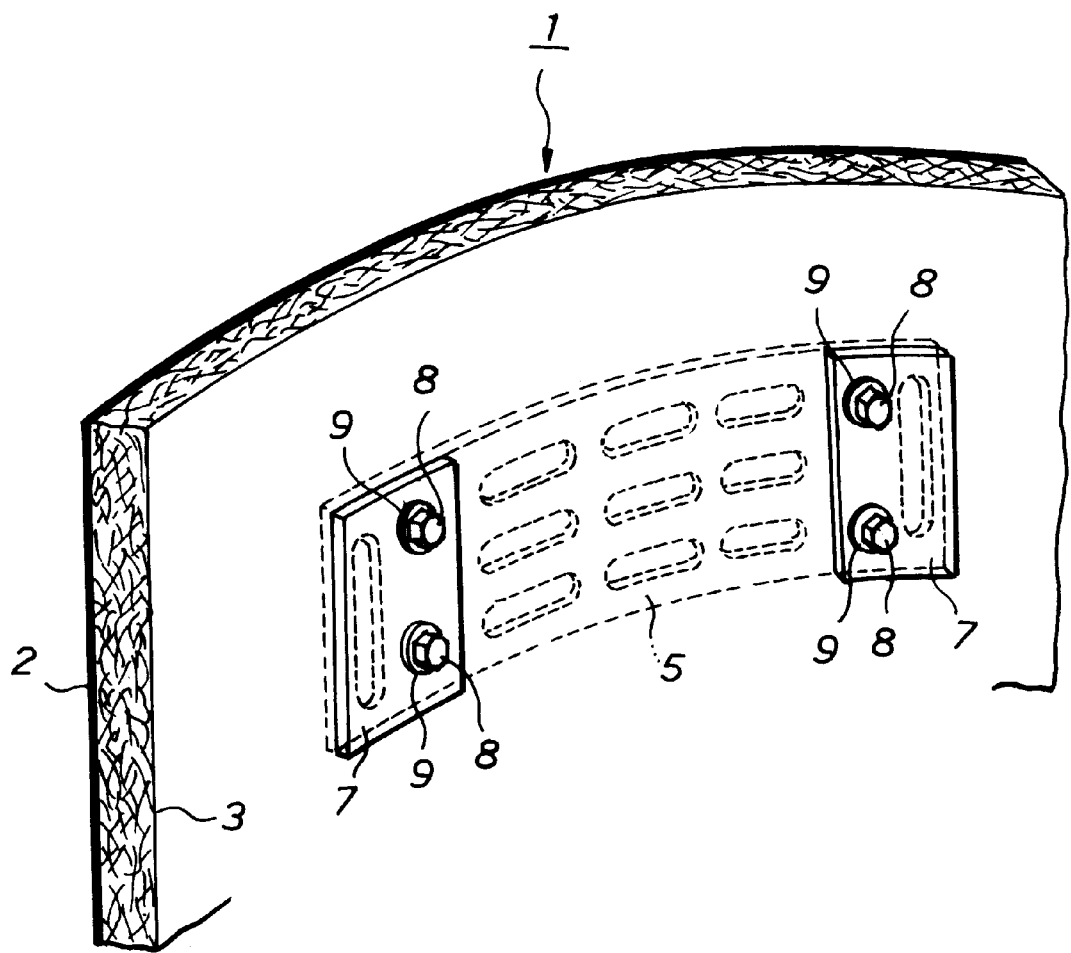
FIG. 2 is a perspective view of that part of the manhole liner bag, as viewed from inside the liner bag, to which is attached a step connector assembly of the present invention.
Figure 3:
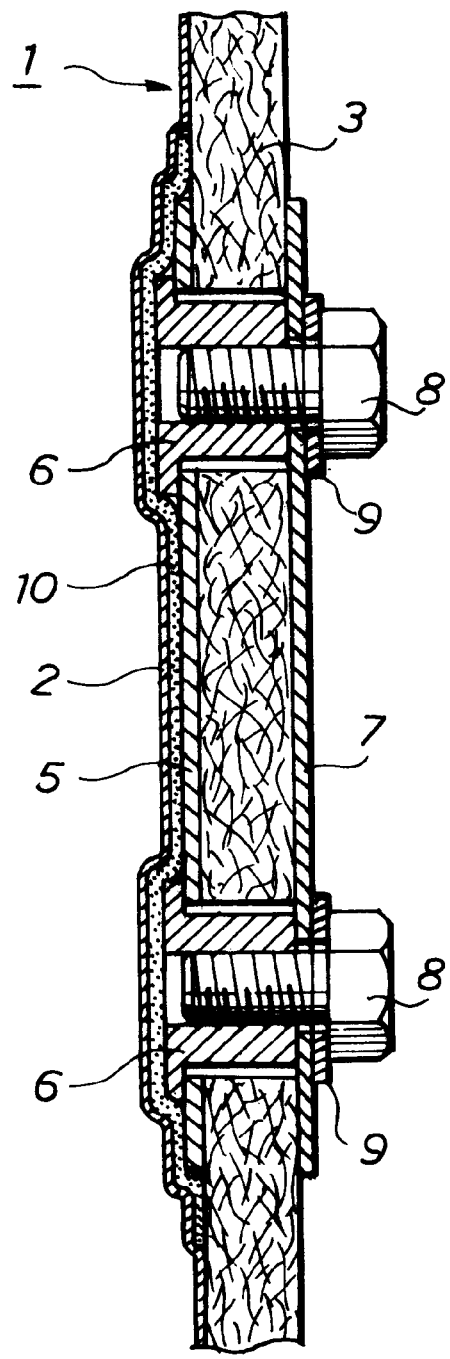
FIG. 3 is a cross-sectional view of the step connector assembly of the manhole liner bag of the present invention.
Figure 4:
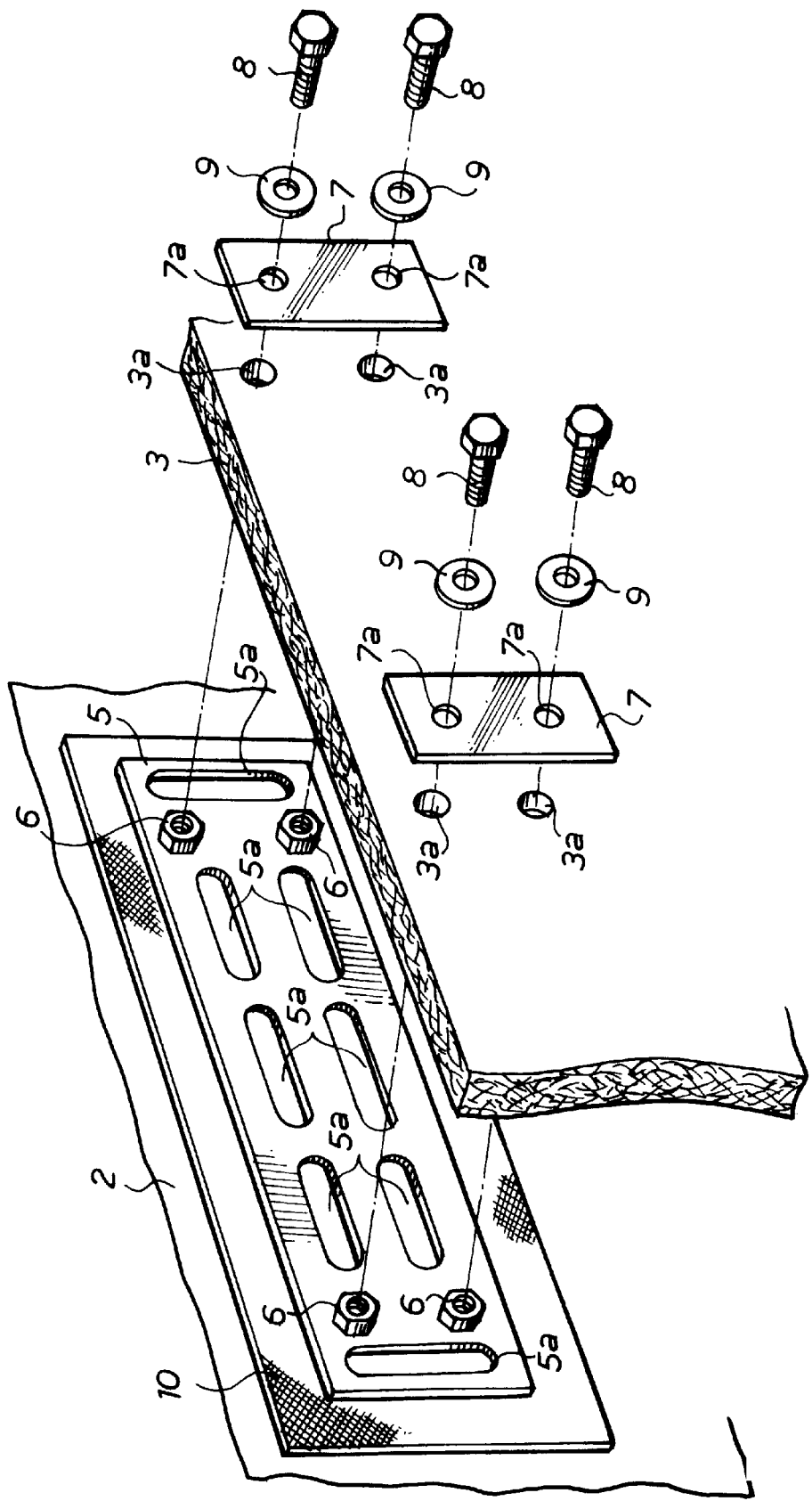
FIG. 4 is an exploded view of the step connector assembly of the manhole liner bag of the present invention.

Next, the manner of attaching the step connector assemblies to the fabric sheets 3-1, 3-2, 3-3, 3-4 of the liner 1 will be described with reference to FIGS. 2 through 5c. FIG. 2 is a perspective view of that part of the liner 1, as viewed from inside the liner bag 1, to which is attached one of the step connector assemblies; FIG. 3 is a cross-sectional view of the step connector assembly; FIG. 4 is an exploded view of the step connector assembly; and FIGS. 5a, 5b, and 5c are perspective views illustrating several embodiments of flanged nut.

As shown in FIG. 4 (wherein the direction in which the elements 8 are shot is inward), a main body of each step connector assembly consists of a thin rectangular plate 5 of synthetic resin or metal, having longer horizontal sides. In the vicinities of the four corners of the plate 5 are provided four flanged nuts 6, which penetrate the plate 5 in a manner such that the nut portions of the flanged nuts 6 are mostly protruding from the inner-side face of the plate 5 and the flange portions thereof rest on the outer-side face-of the plate 5. Then, in the vicinity of each vertical side of the plate 5 is made a vertical track-shaped slit 5a in a manner such that each vertical slit 5a is disposed between the nearest vertical side and the nearest pair of the flanged nuts 6. Also, six horizontal track-shaped slits 5a are made in two horizontal rows in the area surrounded by the four flanged nuts 6.

Figure 5A:
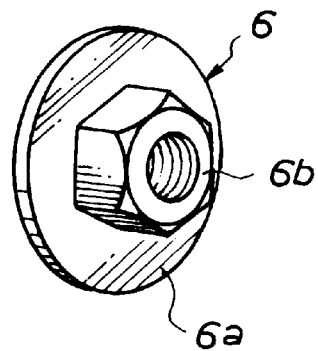
FIGS. 5a, 5b and 5c are perspective views illustrating several embodiments of flanged nut.
Figure 5B:
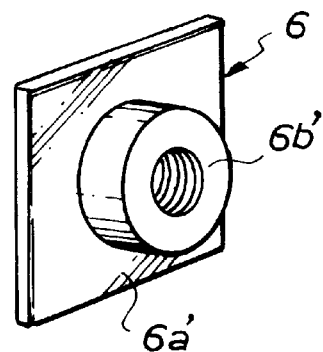
Figure 5C:
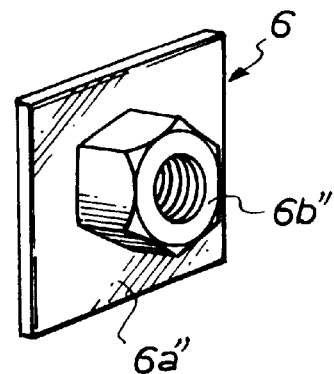

Examples of the flanged nuts 6 are shown in FIGS. 5a, 5b, and 5c. A nut (a) is obtained by spot-welding a hexagonal nut 6b onto a ring sheet metal 6a with a hole in the middle; a nut (b) is obtained by spot-welding a cylindrical nut 6b' onto a rectangular sheet metal 6a' with a hole in the middle; and a nut (c) is obtained by spot-welding a hexagonal nut 6b" nonto a rectangular sheet metal 6a" with a hole in the middle.

Turning back to FIG. 4, the reference numeral 7 designates a pair of thin rectangular plates, which in collaboration with the main body plate 5 sandwich the resin-absorbable fabric layer 3 between them 7 and the plate 5. Each plate 7 is made of metal or synthetic resin and has longer vertical sides as it is assembled in the step connector assembly. Two circular holes 7a are made through each plate 7 at locations near the shorter horizontal sides.

Thus, the main body plate 5 of each step connector assembly is held onto the outer face of the resin-absorbable fabric layer 3 as the four flanged nuts 6 attached to the plate 5 are fitted into circular holes 3a made through the fabric layer 3, from the outer face of the fabric layer 3. Then, the plates 7 are pressed on the inner face of the resin-absorbable fabric layer 3 in a manner such that the holes 7a coincide with the threaded holes of the nuts 6, which are in the holes 3a. Next, bolts 8 are made to penetrate through respective washers 9 and are inserted through the respective holes 7a of the plates 7, and thereafter, the bolts 8 are screwed into the threaded holes of the respective flanged nuts 6, whereupon the main body plate 5 of each step connector assembly is fixed on the resin-absorbable fabric layer 3, and the resin-absorbable fabric layer 3 is sandwiched between the plates 7 and the main body plates 5.

Incidentally, the bolts 8 are meant to plug the threaded holes of the flanged nuts 6 until the the lining operation is over, and the bolts 8 are preferably iron eyeless bolts, and before being screwed into the flanged nuts 6, the threaded shafts of the bolts 8 are coated with a sealing material such as silicone calking. Therefore, when the bolts 8 are screwed into the flanged nuts 6, as shown in FIG. 3, the sealing material fills the gap between the external thread of each bolt 8 and the internal thread of the respective flanged nut 6. Incidentally, it is possible to apply the sealing material to the internal thread of the flanged nuts 6 rather than to the external thread of the bolts 8, or to apply the sealing material to the both of the threads.

As shown in FIGS. 3 and 4, a thin adhesive felt 10, which is made of a heat-sensitive bonding material, is attached to cover each main body plate 5 of the step connector assembly.

When the step connector assemblies are set to the fabric layer 3, the peripheral outer face of the fabric layer 3 together with all the step connector assemblies is closely covered up with a highly airtight polymeric film 2. Then, the resin-absorbable fabric sheet layers 3-1, 3-2, 3-3 and 3-4 are all soaked with a thermosetting liquid resin 4. More particularly, with reference to FIG. 6, the resin-absorbable fabric layer 3 with the step connector assemblies is flattened, and inserted into a larger rectangular bag of the airtight polymeric film 2, which is opened at its one end only. The bottom end of the resin-absorbable fabric layer 3 is brought close to a suction end of a vacuum hose connected to a vacuum pump 12. Then, the vacuum pump 12 is operated to suck at the resin-absorbable fabric layer 3, whereupon the polymeric film 2 is closely pressed upon the surfaces of the fabric layer 3. Next, while things are maintained the way they are in FIG. 6, a heating device is passed over the entire length of the polymeric film 2 from the closed end of the fabric layer 3 to its open end; then, the polymeric film 2 is fused by the heat and permanently adhered to the surfaces of the fabric layer 3 from its bottom to the top. When the entire length of the resin-absorbable fabric layer 3 is thus laminated with the polymeric film 2, most of the portions of the polymeric film bag 2 which do not have the fabric layer 3 under themselves are cut off, hence the shape of the polymeric film bag 2 in FIG. 6. Now, we obtain a manhole liner 1, whose outer surfaces are airtight by virtue of the airtight polymeric film 2.

At this moment, as shown in FIG. 3 and FIG. 4, the thin adhesive felt 10 is interposed between the main body plate 5 of each step connector assembly and the polymeric film 2. When this adhesive felt 10 is heated over the polymeric film 2, the adhesive felt 10 fuses and oozes across the slits 5a, whereby the polymeric film 2 and the fabric layer 3 are strongly bonded together by means of the adhesive produced by the fusion of this adhesive felt 10.

Figure 6:
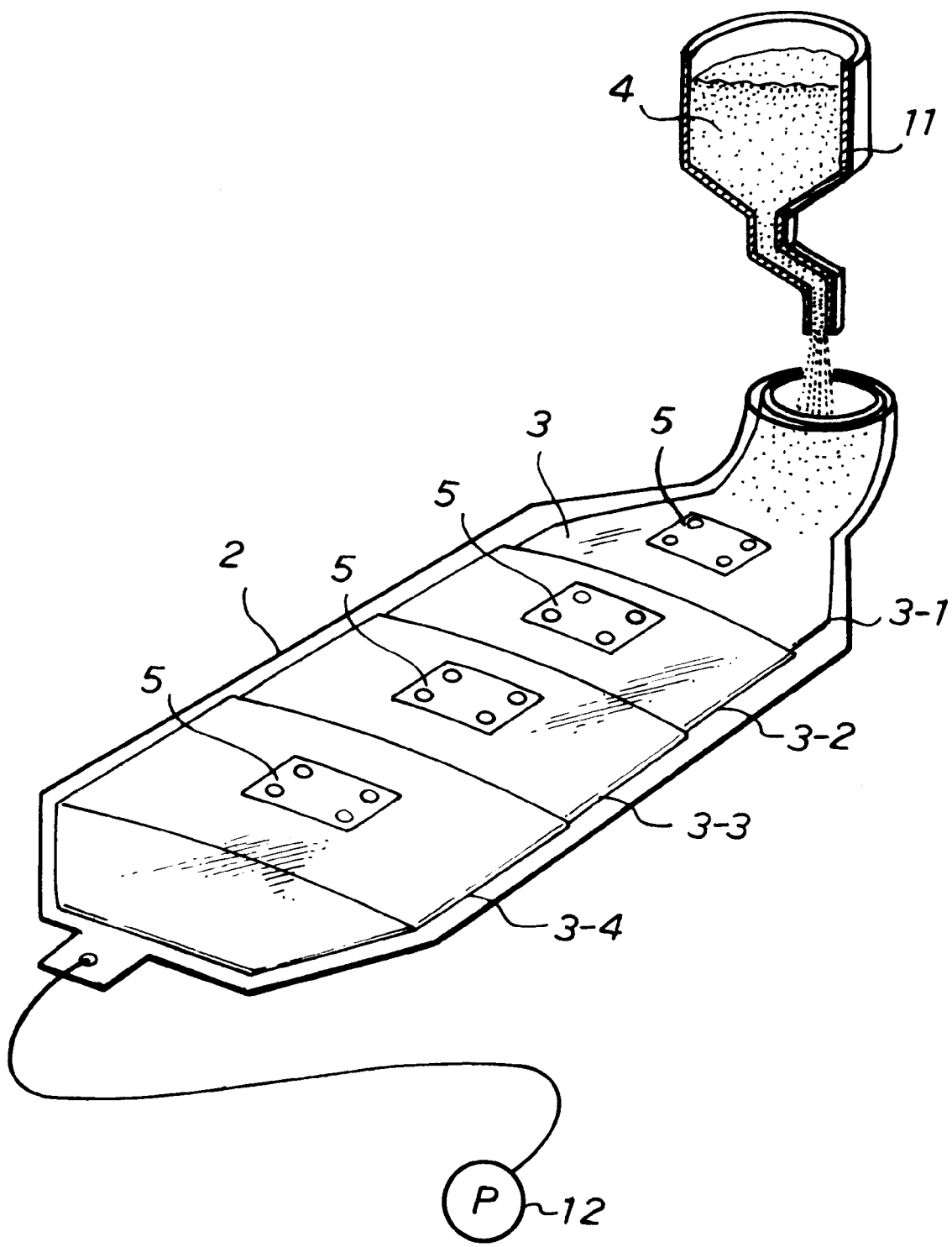
FIG. 6 is a perspective view of the manhole liner bag, illustrating how the liner bag is impregnated with a hardenable liquid resin.

Next, the fabric layer 3 is impregnated with the thermosetting liquid resin 4 in the following manner. With reference to FIG. 6, while the thermosetting liquid resin 4 contained in a resin reservoir 11 is charged into the opening of the manhole liner bag 1, the vacuum pump 12 is operated to suck at the resin-absorbable fabric layer 3; whereupon the liquid resin 4 is drawn by the negative pressure created in the resin-absorbable fabric layer 3 and permeates uniformly through the whole body of the fabric layer 3. Thus, the manhole liner bag 1, as shown in FIG. 1, is obtained.

The airtight polymeric film 2, with which the peripheral outer face of the resin-absorbent fabric layer 3 is lined, is preferably a composite film including a nylon film layer.

When the preparation of the manhole liner 1 is completed, as described above, the liner 1 including the resin-absorbent fabric layer 3 covered up with the polymeric film 2 is preserved in ice water and transported to the sewer sites under this low temperature condition lest the thermosetting liquid resin 4 soaking through the fabric layer 3 of the liner 1 should prematurely start curing. When the liner 1 is submerged in the ice water, since the resin-absorbent fabric layer 3 of the liner 1 is sealed within the highly airtight polymeric film 2, the ice water does not wet the resin-absorbent fabric layer 3 and the thermosetting liquid resin 4 held by the resin-absorbent fabric layer 3 is reliably kept from starting to cure or deteriorate.

When the manhole liner 1 is brought to the manhole repair site to be used to line a manhole 21, the bottom edge of the polymeric film bag 2 is slit open, and the bottom portion la is unfolded, and then the liner bag 1 is inflated to have a voluminous inner space, as shown in FIG. 1.

Figure 11:
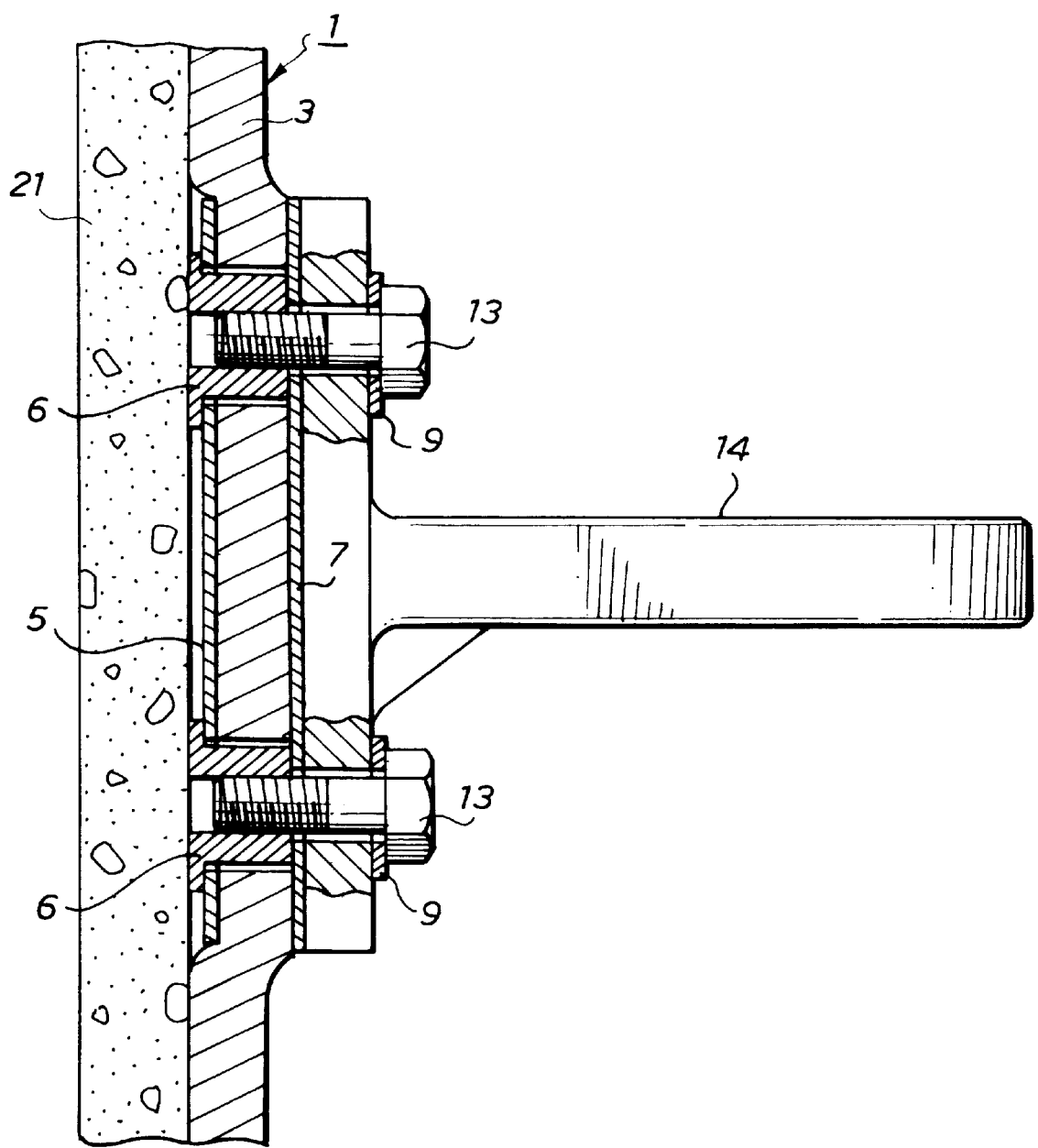
FIG. 11 is a cross-sectional view of the step connector assembly, illustrating how it is disposed when a step has been attached to it.
Figure 12:
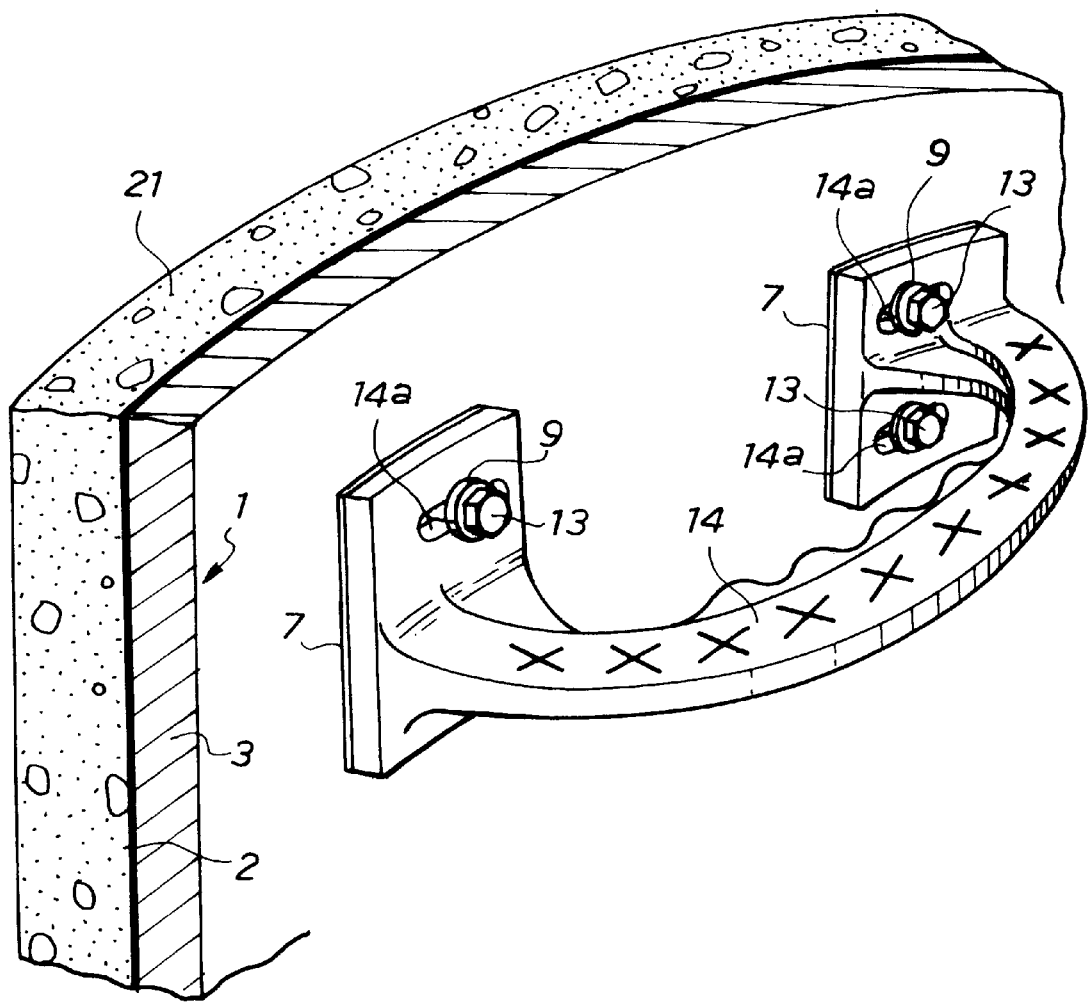
FIG. 12 is a perspective view of the step, illustrating how it is attached to the manhole liner.
Figure 13:
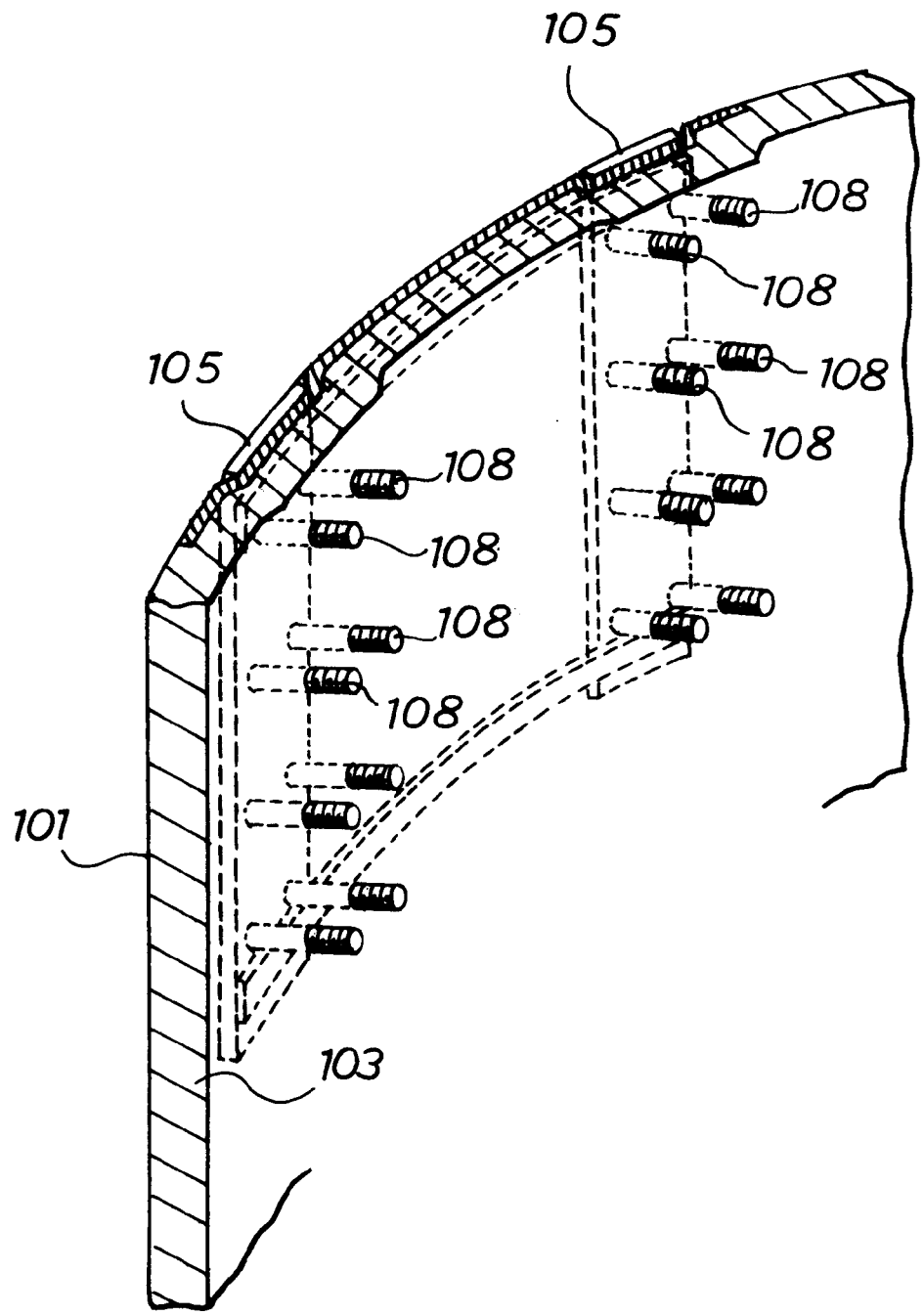
FIG. 13 is a perspective view of a step connector assembly of a conventional manhole liner bag, as viewed from inside the liner bag.
Figure 14:
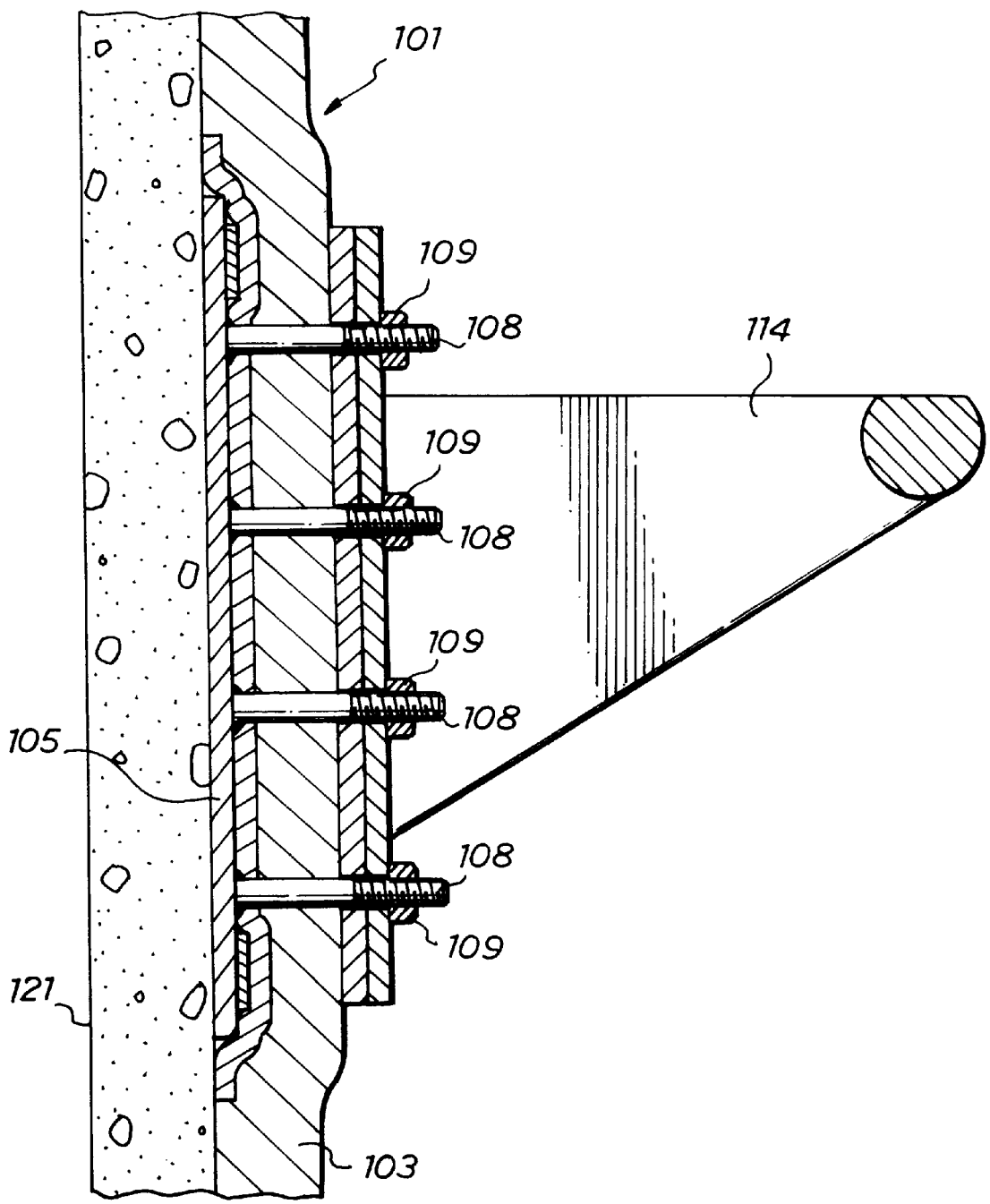
FIG. 14 is a cross-sectional view of the step connector assembly of the conventional manhole liner bag, illustrating how it is disposed when a step has been attached to it.
Figure 15:
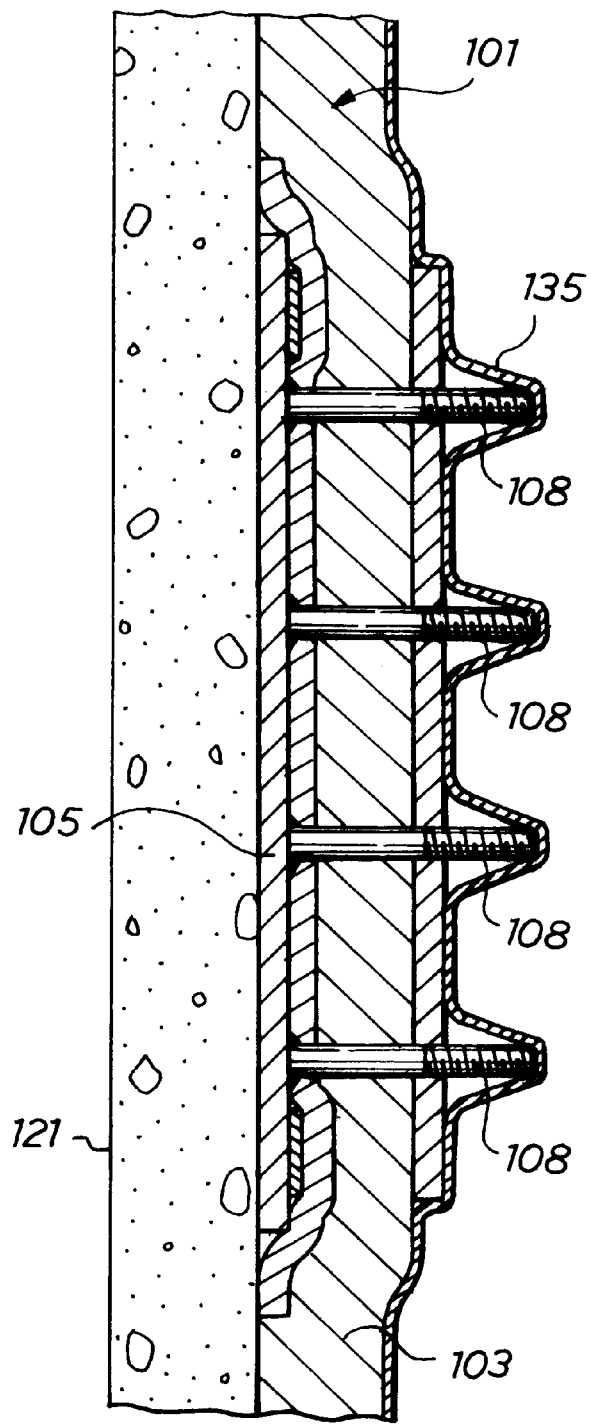
FIG. 15 is a cross-sectional view of the step connector assembly of the conventional manhole liner bag, illustrating how it is disposed when a pressure bag is inflated within the manhole liner bag.
Figure 16:
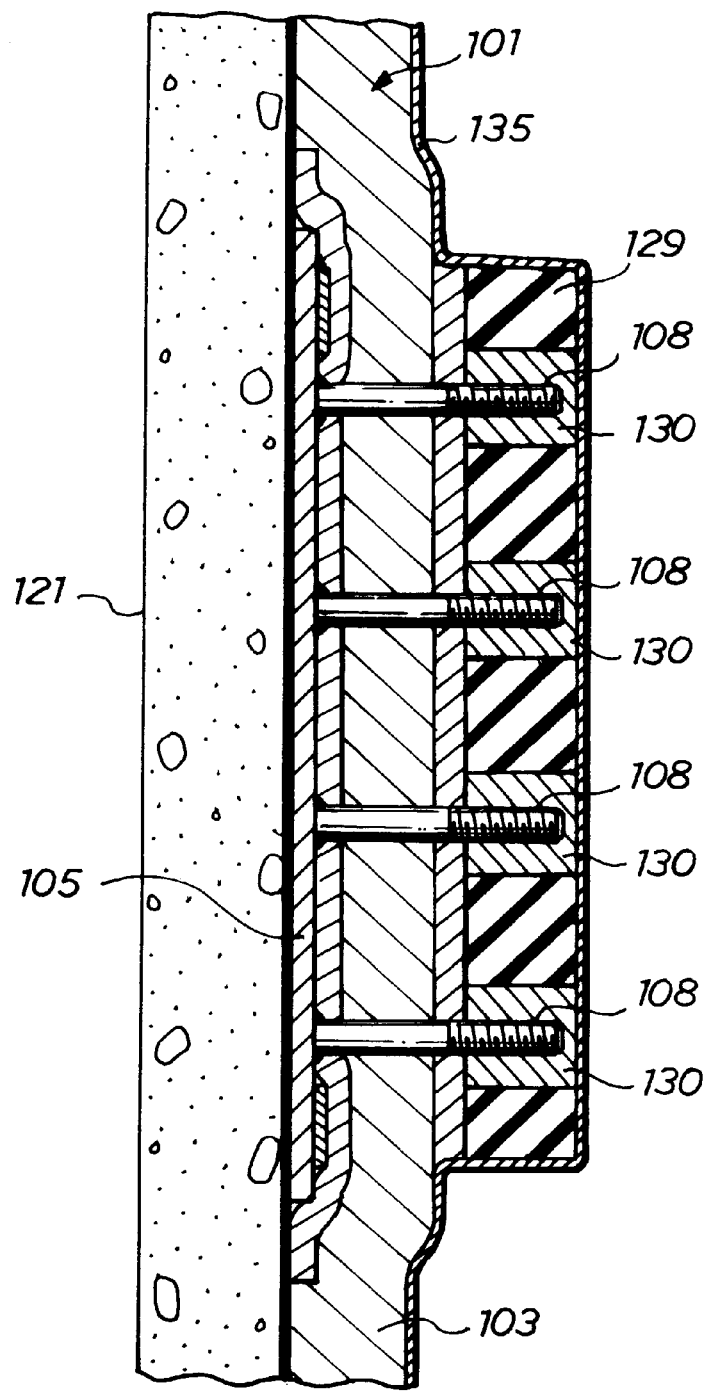
FIG. 16 is a cross-sectional view of a step connector assembly of another conventional manhole liner bag, illustrating how it is disposed when a pressure bag is inflated within the manhole liner bag.

Next, we will explain the inventive method for lining a manhole wherein the manhole liner 1, obtained in a manner as described above, is used, with reference to FIGS. 7 through 12. Incidentally, FIGS. 7 through 10 illustrate the inventive method for lining a manhole in the order of the procedure, FIG. 11 illustrates how the step connector assembly is disposed when a step has been attached to it, and FIG. 12 illustrates how a step is attached to the manhole liner.

In the method for lining a manhole 21, according to the present invention, two water stop plugs 22, 23 having an aperture in them are installed in the pipe 20, one at a location upstream to the manhole 21 and the other downstream to the manhole 21, as shown in FIG. 7, and a hose 24 is passed through the apertures of the water stop plugs 22, 23 so that the drain water in the upstream side of the plug 22 can flow in the hose 24 and run down into the downstream side of the plug 23. Furthermore, the space of the pipe 20 isolated between the water stop plugs 22, 23 is partially filled with a liquid absorbable filler 25 such as sawdust and rice bran. Now, before lining the manhole 21, a set of ladder steps, not shown, have been cut and removed from the manhole 21.

Now, the upper part of the manhole 21 is formed with a reducer portion 21a where the manhole 21 is converged upward. The manhole liner 1 has been inserted (not by eversion) in the manhole 21 from the ground in a manner such that the bottom portion 1a of the liner 1 abuts on the bottom of the manhole 21. The upper open end of the liner 1 extends outside the manhole 21 and is fastened around the lower periphery of an adaptor collar 27, which is supported by a stage 26 installed on the ground.

Now, a pressure bag 35, which is made of a highly airtight polymeric film and generally tubular with its tail end closed, has its one end everted a little to create an annular pocket and fastened around the lower periphery of the adaptor collar 27; when the insertion of the manhole liner 1 into the manhole 21 is completed, water is charged from a water hose 36 into the annular pocket formed by the slight eversion of the pressure bag 35, as shown in FIG. 7. Thereupon, the pressure bag 35 is caused by the water pressure (the water weight) to evert and be inserted downwardly along the manhole liner 1. On this occasion, unlike the conventional art, no bolt shafts are protruding from the inner face of the liner 1, so that the pressure bag 35 is not damaged by such sharp protrusions and hence the likelihood of bursting is greatly reduced.

Figure 8:
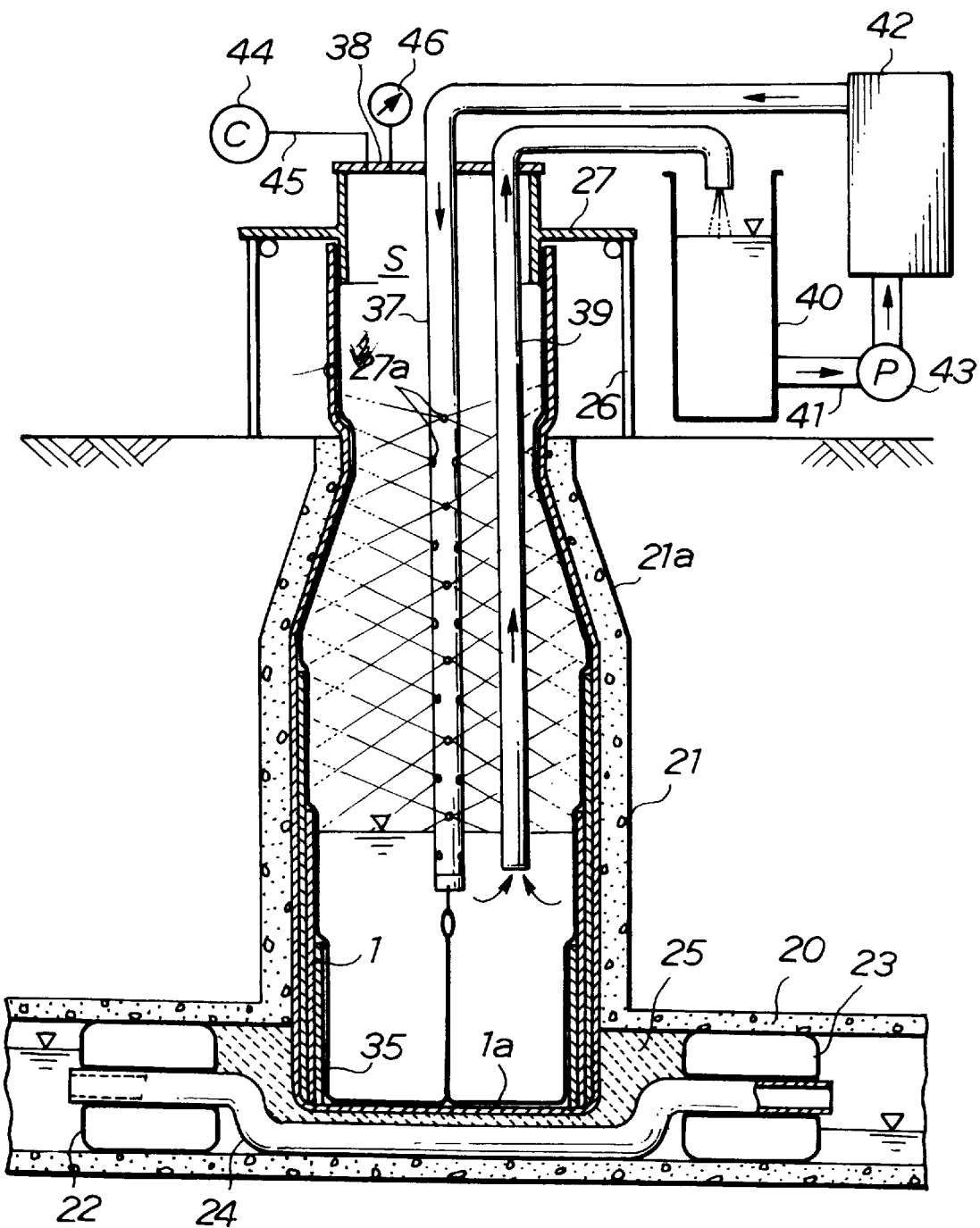
FIG. 8 is a cross-sectional view of the site, illustrating another step of the manhole lining method of the present invention.

When the insertion of the pressure bag 35 along the manhole liner 1 by eversion is completed, a hot water hose 37 attached beforehand to the tail end of the pressure bag 35 is drawn into the everted pressure bag 35, as shown in FIG. 8. The hot water hose 37 is made with a lot of punctures 37a distributed evenly along that portion of the hose 37 which is disposed inside a closed space S (hereinafter described). That end of the hot water hose 37 which is connected to the tail end of the pressure bag 35 is closed.

Next, as shown in FIG. 8, a lid 38 is placed over the top opening portion of the adaptor collar 27, and is fastened there to airtightly close the opening of the collar 27, whereupon a closed space S is formed inside the pressure bag 35.

Now, like the hot water hose 37, a water outlet hose 39 is introduced deep into the space S to open therein, and that part of the water outlet hose 39 which extends outside the closed space S is led to a hot water tank 40 installed on the ground, and the water outlet hose 39 opens over this tank 40.

A water supply pipe 41 leading out from the lower part of the hot water tank 40 is connected to an inlet port of a boiler 42, and a hot water pump 43 is provided across the water supply pipe 41. To an outlet port of the boiler 42 is connected the other end of the hot water hose 37.

An air hose 45 leading out from a compressor 44 is fitted through the lid 38 to open in the closed space S, and a pressure gauge 46 for measuring the inner pressure of the closed space S is provided to communicate with the closed space S across the lid 38.

Thus, as the compressor 44 is driven to supply compressed air to the closed space S via the air hose 45, the pressure bag 35 is inflated with the compressed air and presses the manhole liner 1 upon the inner wall of the manhole 21. Incidentally, on this occasion, as the manhole liner 1 is pressed by the compressed air, the uncured liquid thermosetting resin absorbed in the resin-absorbent fabric layer 3 of the liner 1 is caused to ooze out from the lower end of the liner 1 and drops into the filler 25 such as sawdust and rice bran.

Next, while keeping the things as described above, the boiler 42 and the hot water pump 43 are started, whereupon the water in the hot water tank 40 is drawn and sent to the boiler 42 by the hot water pump 43, and after the water is heated to a predetermined temperature by the boiler 42, it is supplied to the closed space S by way of the hot water hose 37. Then, the hot water rushing into the hot water hose 37 jets out from the punctures 37a of the hot water hose 37 and reaches the surfaces of the manhole liner 1 to heat the same.

When the hot water has been used to heat the liner 1 it becomes lukewarm and falls and gathers in the bottom of the pressure bag 35, and the head of this lukewarm water is pushed down by the internal pressure of the closed space S and, as the result, the water goes up in the water outlet hose 39, and returns to the hot water tank 40; then, the water is again sent to the boiler 42 by the hot water pump 43 and heated and, thereafter, circulated in this system over and over again.

Figure 9:
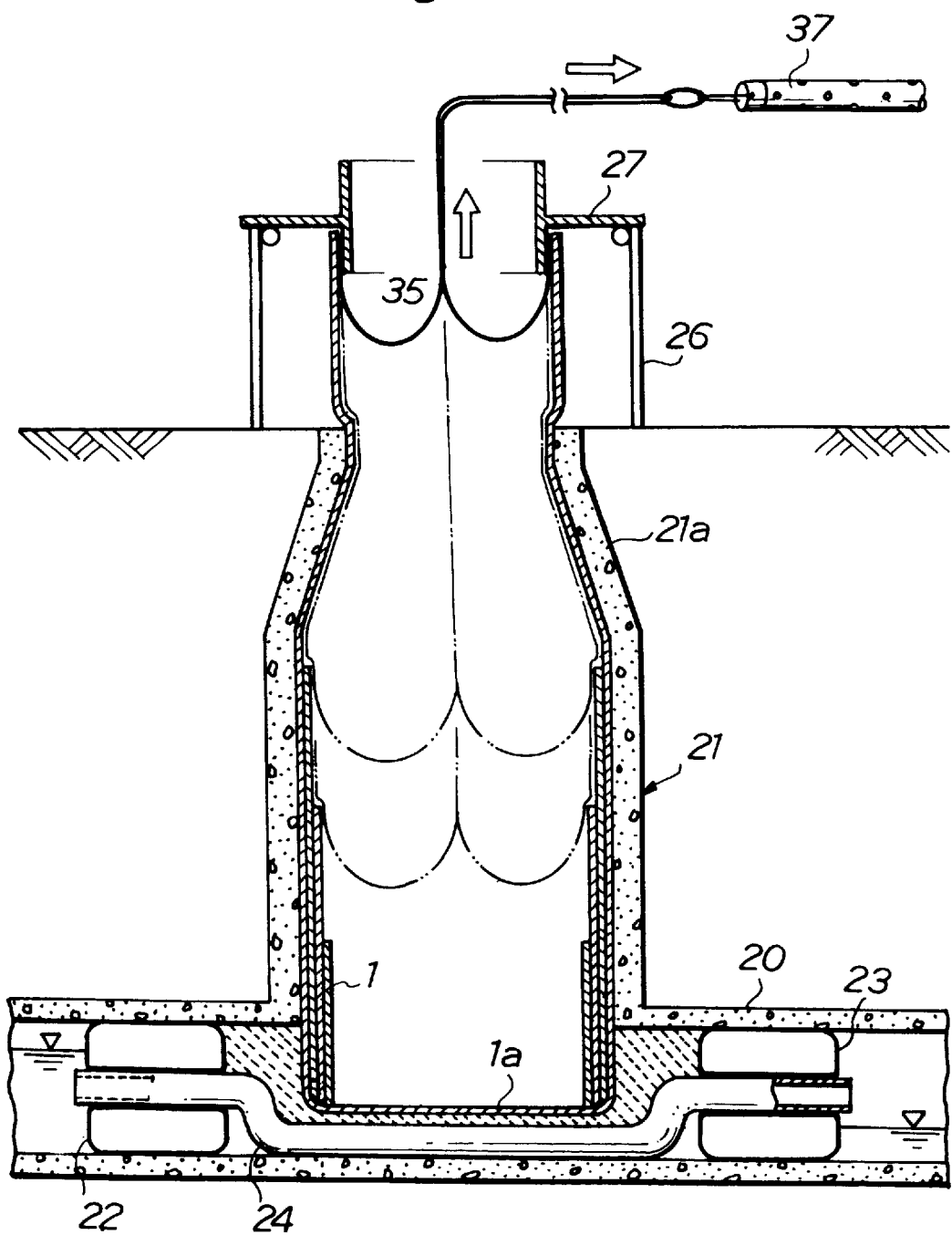
FIG. 9 a cross-sectional view of the site, illustrating yet another step of the manhole lining method of the present invention.

As described above, as the hot water is circulated, the hot water jets out from the evenly distributed punctures 37a of the hot water hose 37 and heats the liner 1 to cause the thermosetting resin absorbed in the resin-absorbent fabric layer 3 to cure evenly and promptly. When the thermosetting resin in the liner 1 is thus hardened, the pressure bag 35 together with the stage 26 and the adaptor collar 27 is removed from the manhole liner 1, as shown in FIG. 9. Now, the inner wall and the bottom floor of the manhole 21 are closely lined with the rigid liner 1.

Figure 10:
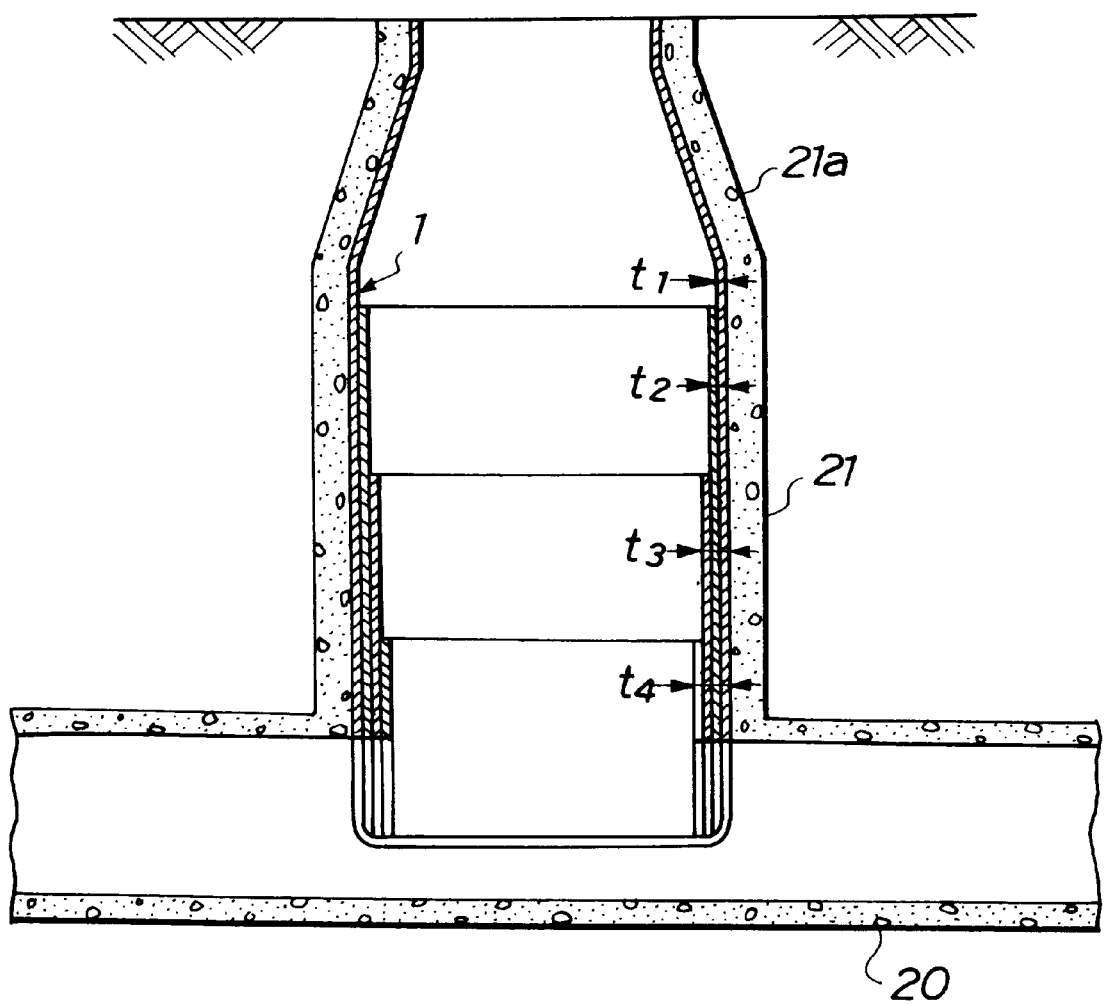
FIG. 10 is a cross-sectional view of the site, illustrating still another step of the manhole lining method of the present invention.

Next, as shown in FIG. 10, that part of the manhole liner 1 which covers a part of the inner wall of the pipe 20 is cut and removed, and the cut faces are sealed with a putty such as an epoxy resin. Also, that portion of the manhole liner 1 which extends outside the manhole 21 is cut off.

As of now, exposed from the inner face of the hardened liner 1 are the heads of the bolts 8 screwed into the flanged nuts 6, which are attached to the main body plates 5 of the step connector assemblies, and these bolts 8 are unscrewed and removed; then, as shown in FIGS. 11 and 12, steps 14 are fastened to the inner wall of the liner 1 by means of bolts 13 made of stainless steel. More particularly, each step 14 has a pair of attachment plates and each attachment plate is made with a pair of horizontal slits 14a, an upper one and a lower one, as shown in FIG. 12. The bolts 13 are inserted through the respective slits 14a over the washers 9 and are screwed into the flanged nuts 6, whereby each step 14 is fastened to the inner face of the liner 1 by means of the four bolts 13. As the result, four steps 14 are provided in a row extending in the direction of the depth of the manhole liner 1 at appropriate intervals.

As described above, a sealing material such as silicone calking is applied between the internal thread of each flanged nut 6 and the external thread of each eyeless bolt 8, so that the uncured thermosetting liquid resin 4 impregnated through the resin-absorbent fabric layer 3 cannot permeate along the internal thread of the flanged nut 6 and then harden to clog the thread groove. Hence, the eyeless bolts 8 are easily removed from the flanged nuts 6 and the steps 14 are easily connected to the step connector assemblies by screwing the bolts 13 into the flanged nuts 6,n thus the operation efficiency is improved.

Incidentally, the pressure that works upon the outer walls of the manhole 21, imposed by the underground water, etc., increases with depth, so that it is considered rational and safer to design the thickness of the manhole to become greater with depth. Thus, in the present embodiment of the invention, the liner 1, which is applied to the inner wall of the aged manhole 21 for rehabilitation, is designed in a manner such that its thickness increases stepwise as the depth increases.

When the above-described lining operation is completed, the water stop plugs 22, 23 and the hose 24 are removed from the pipe 20, and then the filler 25 remaining in the pipe 20 is carried downstream in the pipe 20 by the drain water, so that the thermosetting resin that has dropped into the filler 25 during the lining operation is also brought away together with the filler 25. Consequently, the thermosetting resin 4 that has dropped in the pipe 20 does not remain in the pipe 20, and the work of removing the hardened resin drops from the manhole 21 is not necessary.

Also, according to the method of the invention, even during the lining operation, the drain water is allowed to flow in the pipe 20 past the manhole 21 by virtue of the hose 24, so that it is no longer necessary to pump out the drain water from the pipe 20 at a location which is upstream to the manhole 21 and discharge it at some other place. Hence, the operation is significantly rationalized.

Incidentally, in the above example, although hot water showering is used as the method for thermally curing the thermosetting resin, it is equally effective to employ other heating methods such as filling the pressure bag 35 with hot water, circulating hot water, and using steam. Also, it is possible that the thermosetting resin may be replaced by another curable liquid resin such as photosetting resin.

While the invention has been described in its preferred embodiments, it is to be understood that modifications will occur to those skilled in the art without departing from the spirit of the invention. The scope of the invention is therefore to be determined solely by the appended claims.

What is claimed is:

1. A manhole liner with which an inner wall of a manhole is lined, comprising a resin-absorbent fabric layer soaked with a curable liquid resin, an airtight film layer covering up an outer face of said resin-absorbent fabric layer, and at least one step connector assembly capable of receiving a ladder step, said step connector assembly including a plurality of female screw means, which are supported by said fabric layer and whose male screw receiving ends are substantially flush with an inner face of said fabric layer.

2. The manhole liner as recited in claim 1, wherein said manhole liner is tubular in shape and said airtight film layer is bonded to said outer face of said resin-absorbent fabric layer.

3. The manhole liner as recited in claim 2, wherein said tubular manhole liner has a bottom made of the same materials as the tubular part of the liner, such that the manhole liner is a bag, and said airtight film layer is bonded to said outer face of said resin-absorbent fabric layer by having been fused.

4. The manhole liner as recited in claim 3, wherein said fabric layer is penetrated by each one of said female screw means.

5. The manhole liner as recited in claim 4, wherein each one of said female screw means has a flange portion provided at the other end thereof, said flange portion being disposed between said resin-absorbent fabric layer and said airtight film layer.

6. The manhole liner as recited in claim 5, wherein said step connector assembly further includes a first plate, which is disposed between said flange portion of the female screw means and said resin-absorbent fabric layer and, where said female screw means is absent, between said airtight film layer and said resin-absorbent fabric layer, and through which said female screw means penetrate.

7. The manhole liner as recited in claim 6, wherein said airtight film layer and said resin-absorbent fabric layer are bonded together by means of a heat sensitive adhesive at locations constituting a marginal area surrounding said first plate.

8. The manhole liner as recited in claim 6, wherein said first plate has at least one penetrating hole in addition to those through which said female screw means penetrate, and said airtight film layer and said resin-absorbent fabric layer are bonded together by means of an adhesive at locations of said at least one penetrating hole.

9. The manhole liner as recited in claim 8, wherein said airtight film layer and said resin-absorbent fabric layer are bonded together at locations constituting a marginal area surrounding said first plate also.

10. The manhole liner as recited in claim 6, wherein said step connector assembly further includes at least one male screw means, which is screwed into said female screw means.

11. The manhole liner as recited in claim 10, wherein a sealing material is applied between an internal thread of said female screw means and an external thread of said male screw means.

12. The manhole liner as recited in claim 11, wherein said step connector assembly further includes at least one second plate, which is disposed on the inner face of said resin-absorbent fabric layer and is penetrated by said male screw means.

13. The manhole liner as recited in claim 12, wherein said male screw means is a bolt and said step connector assembly further includes a washer disposed between the head of said bolt and said second plate.

14. The manhole liner as recited in claim 1, wherein said airtight film layer is a composite film layer including a nylon film.

15. The manhole liner as recited in claim 1, wherein the thickness of said resin-absorbent fabric layer increases stepwise from the upper end to the lower end thereof.

16. A method for lining a manhole comprising the steps of: (a) inserting into the manhole a tubular liner having a resin-absorbent fabric layer soaked with a curable liquid resin, an airtight film layer covering up an outer face of said resin-absorbent fabric layer, and at least one step connector assembly capable of receiving a ladder step, said step connector assembly including a plurality of female screw means which are supported by said fabric layer and whose male screw receiving ends are substantially flush with the inner face of said fabric layer; (b) inserting an inflatable pressure bag inside the tubular liner; (c) closing the open end of the pressure bag thereby forming a closed space inside the pressure bag; (d) supplying pressurized fluid to said closed space to thereby cause said pressure bag to inflate and press said manhole liner against the inner wall of the manhole; (e) curing said liquid resin to thereby harden said manhole liner; (f) removing the pressure bag from the manhole; and (g) connecting at least one ladder step to said step connector assembly by screwing a plurality of male screw means into said female screw means.

17. A method for lining a manhole comprising the steps of: (a) preparing a tubular liner having a resin-absorbent fabric layer soaked with a curable liquid resin, an airtight film layer covering up an outer face of said resin-absorbent fabric layer, and at least one step connector assembly capable of receiving a ladder step, said step connector assembly including a plurality of female screw means which are supported by said fabric layer and whose male screw receiving ends are substantially flush with the inner face of said fabric layer; (b) screwing a male screw means into each one of said female screw means after applying a sealing material to a threaded surface of said female screw means or said male screw means or both of these; (c) inserting this tubular liner into the manhole; (d) inserting an inflatable pressure bag inside the tubular liner; (e) closing the open end of the pressure bag thereby forming a closed space inside the pressure bag; (f) supplying pressurized fluid to said closed space to thereby cause said pressure bag to inflate and press said manhole liner against the inner wall of the manhole; (g) curing said liquid resin to thereby harden said manhole liner; (h) removing the pressure bag from the manhole; (i) unscrewing said male screw means from said female screw means; and (j) connecting at least one ladder step to said step connector assembly by screwing a plurality of male screw means into said female screw means.

\* \* \* \* \*